Jan. 8, 1957 O. E. SAARI 2,776,578
SKEW AXIS GEARING AND METHOD OF MAKING SAME
Filed Feb. 18, 1954 6 Sheets-Sheet 2

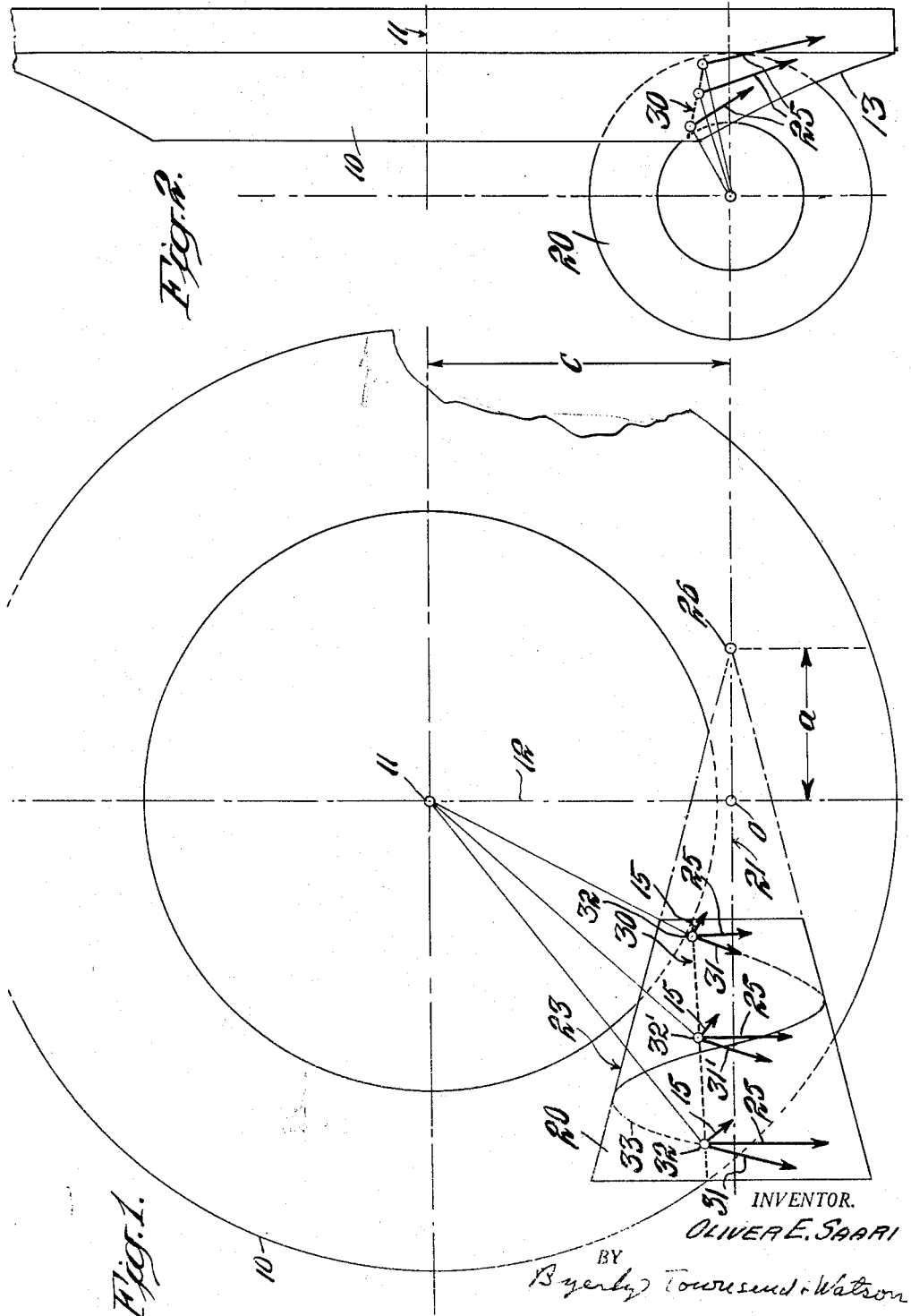

INVENTOR.
OLIVER E. SAARI
BY
Byerly, Townsend & Watson
ATTORNEYS

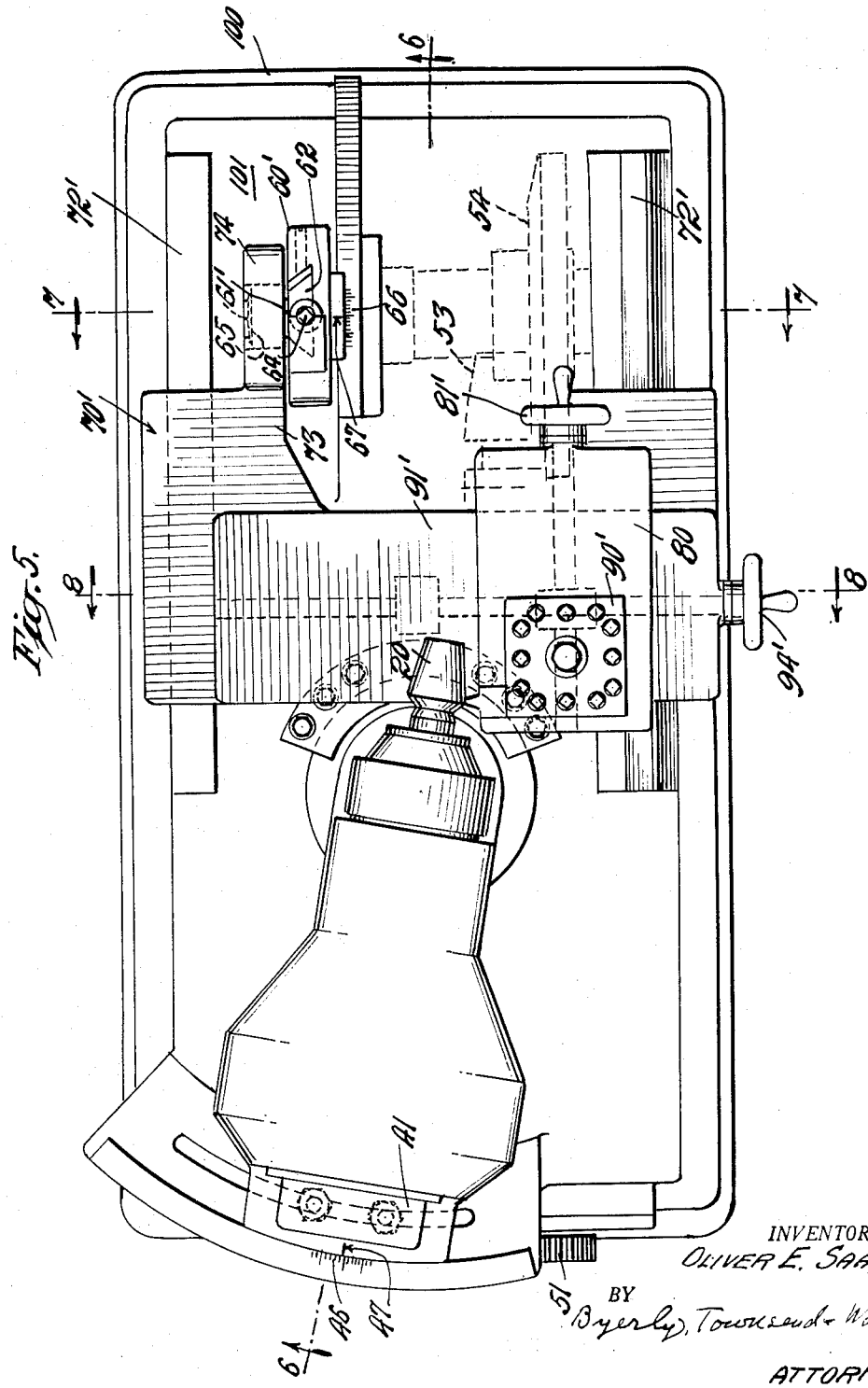

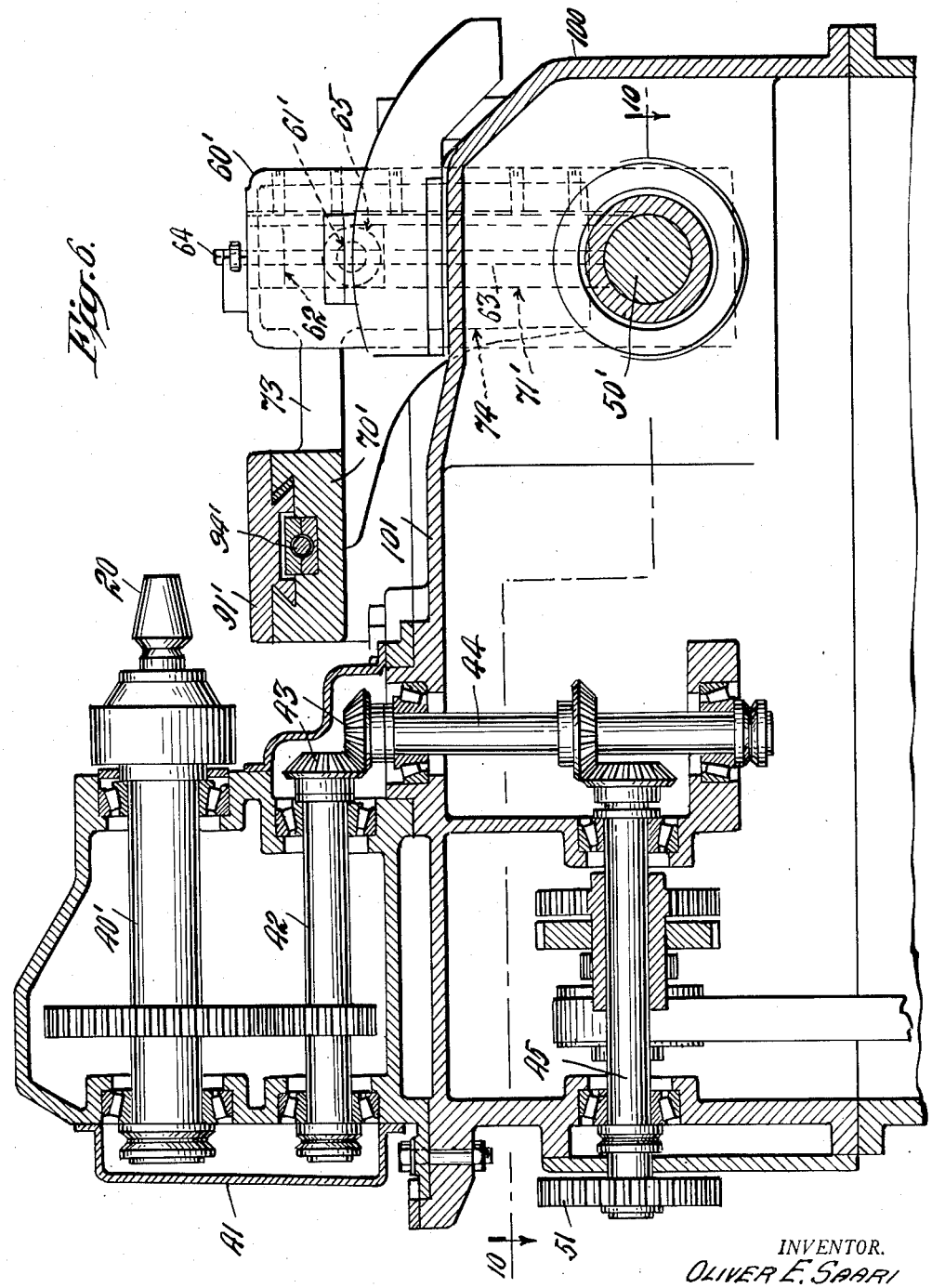

Jan. 8, 1957 O. E. SAARI 2,776,578
SKEW AXIS GEARING AND METHOD OF MAKING SAME
Filed Feb. 18, 1954 6 Sheets-Sheet 5
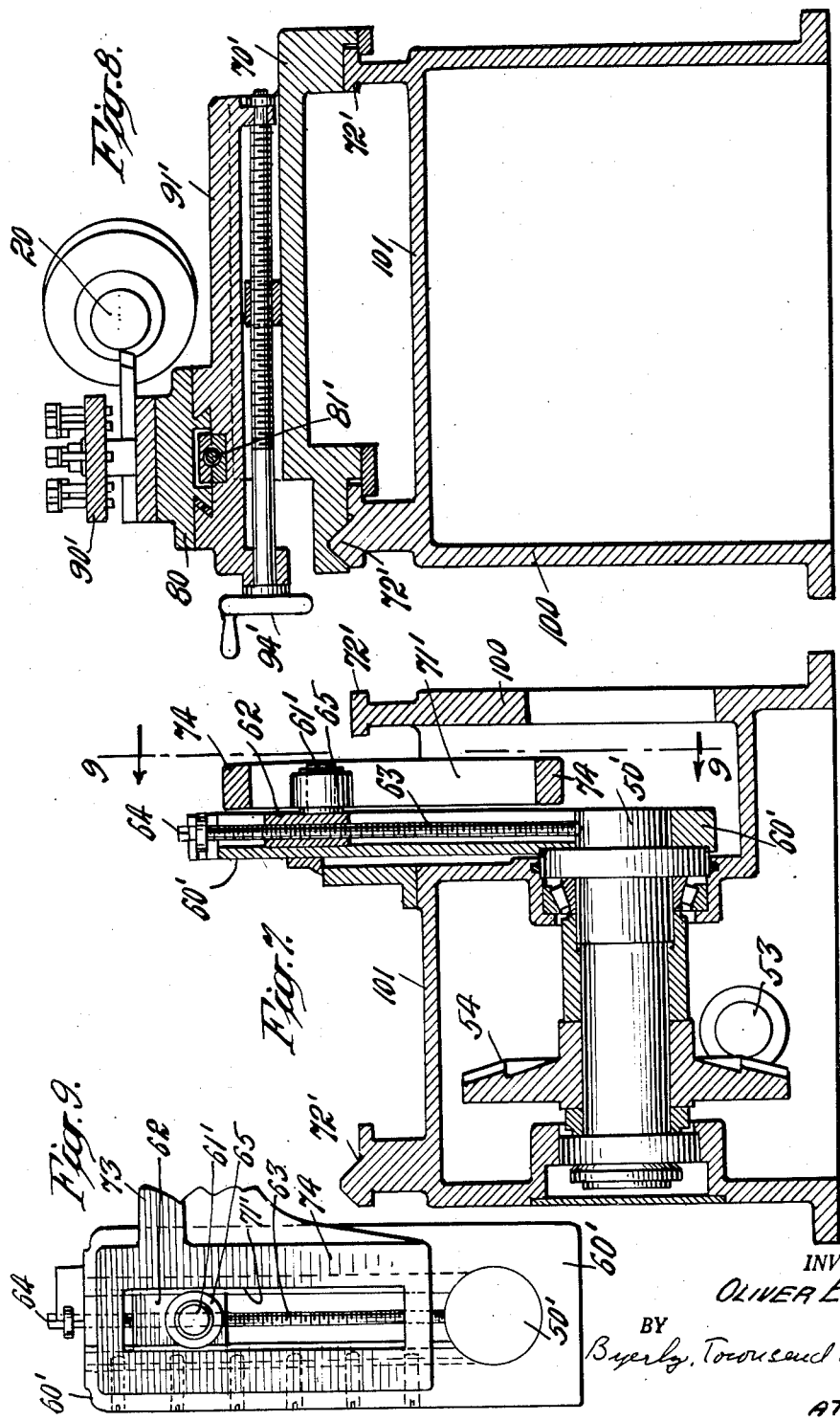
INVENTOR.
OLIVER E. SAARI
BY
Byerly, Townsend & Watson
ATTORNEYS

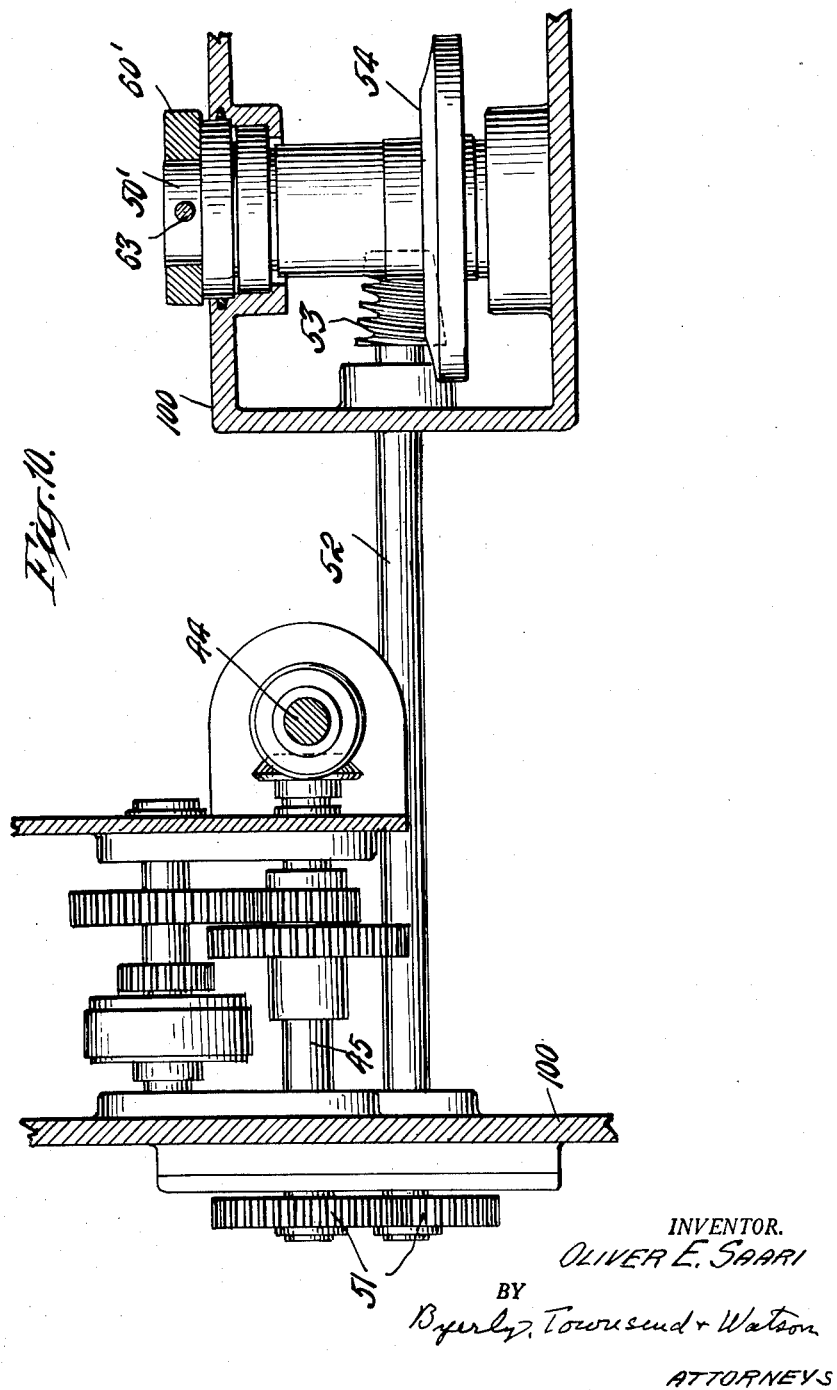

United States Patent Office 2,776,578
Patented Jan. 8, 1957

2,776,578

SKEW AXIS GEARING AND METHOD OF MAKING SAME

Oliver E. Saari, Scheller Park, Ill., assignor to Illinois Tool Works, Chicago, Ill., a corporation of Illinois Application February 18, 1954, Serial No. 411,145

4 Claims. (Cl. 74—459.5)

The invention relates to skew axis gearing and to a method of making such gearing. A specific object is to produce a pair of skew axis gears having teeth of such form that the entire side surfaces of the teeth of each member contact with and transfer power to the entire side surfaces or the teeth or thread of the other member.

Skew axis gearing of substantial reduction ratio consists of a larger member, which for convenience I shall term "the gear," and a smaller member which I shall call "the worm." A convenient method of making such gearing consists in first forming the worm and also a hob of the same shape as the worm and then using this hob to cut teeth on a gear blank, bringing it into the same positional relationship to the gear blank as the worm is to have to the finished gear. This method insures meshing of the worm with the gear, but it does not ordinarily result in producing efficient gear teeth. This is because in this method the outer edges of the teeth or thread of the hob produce fillets or undercut portions on the teeth of the gear, and these fillets and undercuts, which may occupy a large proportion of the sides of the gear teeth, do not come into operative contact with the sides of the worm during the use of the gearing.

I have found that, when a hob corresponding to the worm member of the skew axis gearing is used to cut teeth on the gear, the formation of fillets and undercuts can be avoided only by making the form of the thread such that at each point of its outer surface the thread extends in the direction of the relative motion between that point and the point of the gear blank with which it comes in contact. This principle has, so far as I am aware, not heretofore been recognized.

Specific types of gearing have heretofore been designed in which the thread of the worm and the teeth of the gear extend parallel to the direction of the relative motion of corresponding points on so-called "pitch surfaces" of the worm and gear. The pitch surface of the worm has ordinarily been taken as a surface between the inner and outer ends of the teeth or thread of the worm instead of at the outer ends of these teeth, and the designs have been limited to cases where the conjugate pitch surfaces of the gear and the worm are each of a simple mathematical form so that the direction of relative movement of these surfaces along their line of contact traces a simple curve, such for example as a parabola.

My method of producing a skew axis gearing differs from those heretofore used in two respects:

It provides for giving the outer surface of the thread on the worm, rather than an intermediate surface of the thread, the form required in order that at each point the thread may extend parallel to the relative motion between that point and the point of the gear blank which is contacts. In this way, my method is able to provide for complete elimination of fillets.

It differs still more radically from previous methods in that it is not limited to the few and often inconvenient special cases in which simple cognate pitch surfaces are chosen for the two members of the gearing.

If any convenient surface of revolution is chosen for the outer surface of the worm member of a skew axis gearing, it is possible to calculate mathematically the form of a cognate surface of revolution about the axis of the other member of the gearing which will contact with the chosen surface along a line, and also to calculate the position of this line of contact. With knowledge of the fixed gear ratio at which the gearing is to operate, it is then possible to calculate two vectors giving the direction and velocity of the two cognate surfaces at any point of this line of contact. The vector which is the difference between these two vectors and which may be termed a "relative velocity vector" indicates the direction of the relative movement of two cognate surfaces of revolution at a point of the line of contact. The determination of this vector for each point of the line of contact is a somewhat complicated calculation, as the absolute motion of each point of each cognate surface depends upon the rate of rotation of the surface and the distance of the point from the axis of the surface, and the variation in the ratio of the distances from the two axes at points along the line of contact does not follow any simple law.

A spiral curve drawn on the outer surface of the worm member intersects the line of contact between the worm and its cognate surface at successive points of this line of contact as the surfaces rotate. I have found that there is one, and only one, such spiral which is tangent to the relative velocity vector at each point at which it intersects the line of contact. This spiral curve, which for convenience I shall call "the relative velocity vector spiral," may be formulated in various ways. It can most conveniently be formulated in terms of lead vs. axial distance; but the mathematical expressions thus formulated are so complicated that a thread of the required form cannot be cut with any known mechanical apparatus.

My invention gives practical utility to my determination of the shape of the thread required to avoid the formation of fillets by providing a method for cutting on a worm blank a thread having a form very closely approximating that of "the relative velocity vector spiral" which is theoretically required to avoid fillets and undercuts.

My invention of accomplishing this is to use three separate means for controlling the rate of movement of a cutting tool in relation to the rate of rotation of the work, and setting these three separate means in such a way that the tool cuts on the work a thread whose slope, curvature and rate of change of curvature are identical with the slope, curvature and rate of change of curvature of "the relative velocity vector spiral" at one transverse plane of the work. As the result of controlling these three parameters, the thread which is cut on the work is identical with the theoretical spiral at one transverse plane of the work and very closely approximates the form of the theoretical spiral for a considerable distance at each side of this plane.

In accordance with my invention, the thread is cut by rotating the work and giving a tool a movement which is a sinusoidal function of the turning of the work. Specifically, the tool is moved along the work at a rate which is proportional to the sine of an angle which is a fraction of the angle through which the work is turned. The lead and the first and second derivatives of the lead of the thread cut on the work are predetermined by adjusting (1) the relation between the angle through which the work is turned and the angle whose sine is used, (2) the relation between the sine of this angle and the extent of movement of the tool, and (3) the value which this angle has when the tool engages the work at a selected intermediate transverse plane of the work.

In order to make the practice of my invention clear to those skilled in the art, I will describe in detail a specific method for making a skew axis gearing in accordance with my invention. In describing this specific method I will describe also a specific gearing embodying my invention and a thread-cutting machine useful in the practice of the specific method described.

In the specific description I shall refer to the accompanying drawings in which

Fig. 1 is a diagram of a skew axis gearing looking in the direction in which the axis of the gear extends;

Fig. 2 is a similar diagram looking in the direction of the axis of the worm;

Figure 3:
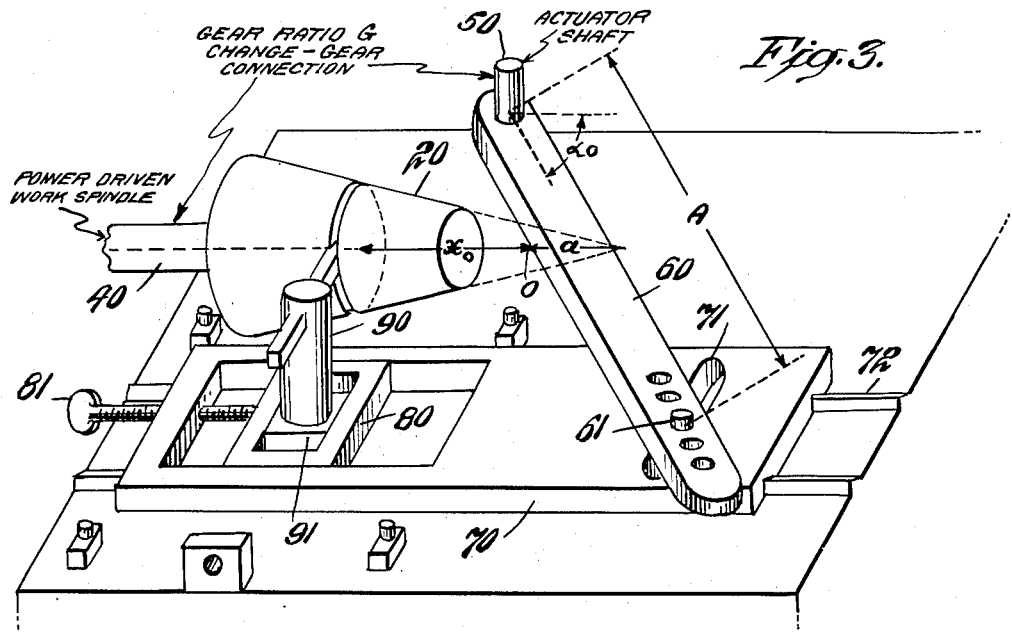
Figure 4:
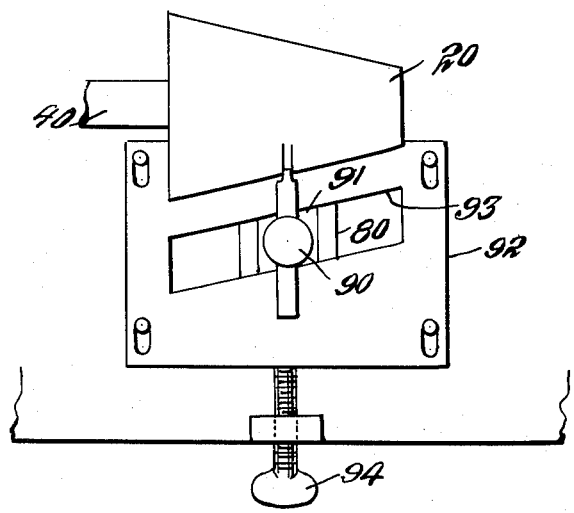

Figs. 3 and 4 are diagrams indicating the operation of a machine for cutting the thread on the worm; and Figs. 5 to 10 illustrate a specific thread-cutting machine which may be used in my method, Fig. 5 being a plan view, Fig. 6 a side elevation sectioned on the line 6—6 of Fig. 5, Figs. 7 and 8 transverse vertical sections on the lines 7—7 and 8—8 of Fig. 5, Fig. 9 a section on the line 9—9 of Fig. 7, and Fig. 10 a horizontal section on the line 10—10 of Fig. 6.

In order to make the description as simple as possible, I have selected as the skew axis gearing whose making is to be described in detail a gearing in which a conical surface is chosen for the outer surface of the worm member and the axis of this conical surface is made perpendicular to the axis of the gear. A gearing of this type is illustrated diagrammatically in Figs. 1 and 2. In addition to showing the gear 10 and the worm 20 the diagrams indicate the axis 11 of the gear, the axis 21 of the worm, a radial plane 12 of the gear which is perpendicular to the axis of the worm and the intersection O of this plane with the worm axis.

The surface of revolution 13 about the axis 11 of the gear which is cognate with the conical surface of revolution 23 of the worm is calculated mathematically, and the position of the line of contact 30 of the cognate surfaces of revolution is then determined mathematically. Using the gear ratio K at which the gearing is to operate, vectors 15 indicating the velocity and direction of movement of the surface 13 at points along the line 30 are then calculated, as are also vectors 25 indicating the velocity and direction of movement of the conical surface 23 at corresponding points of the line 30. The relative velocity vectors 31 are then obtained by subtraction and the relative velocity vector spiral 33 is formulated.

In the position of the worm shown in Fig. 1, the spiral 33 intersects the line of contact 30 at two points 32 at each of which it is tangent to one of the relative velocity vectors 31 shown in Fig. 1. The form of the curve is such that, as the cone rotates so that the spiral intersects the line of contact at other points, the spiral is tangent to the relative velocity vector at each point at which it intersects the line of contact 30. Thus when the cone is turned so that the spiral 33 intersects the contact line 30 at 32', it is tangent to the vector 31' at that point.

In formulating the spiral 33, it is necessary to use the constant K which is the gear ratio and constants indicating the form of the conical surface 23 and its position in reference to the gear 10. These constants are $t$, the taper angle of a conical surface 23 measured between its axis and its side; $C$, the distance between the axis 11 of the gear and the axis 21 of the worm measured in the plane 12; and the distance $a$ from the plane 12 to the apex 26 of the conical surface. By the use of these constants, the curve 33 may be formulated in various ways, the most convenient of which is the form:

$$l = F(x)$$

where $l$ represents the axial lead of the curve in inches per radian and $x$ represents distances in inches along the axis 21 measured from the point O.

The value of $F(x)$ can be determined from the geometry of the gearing arrangement shown in Figs. 1 and 2.

This leads to the following formulation of the lead of the relative velocity vector spiral 33:

$$l = \frac{C}{K\left[\frac{(a+x)\tan^2 t + x}{x}\right] - \frac{\sqrt{[(a+x)\tan^2 t + x]^2 - C^2 \tan^2 t}}{(a+x)\tan t}} \quad (1)$$

Certain features of the curve 33 are apparent from the value of $l$ in the terms of $x$ as given by the above equation and from the derivatives of $l$ with respect to $x$ which can be obtained from the above equation.

(1) The lead $l$ is the first-order variation of the curve 33. Two curves having the same $l$ value at a common point have the same slope or direction, and are, therefore, tangent, but do not necessarily have the same curvature or higher-order variations.

(2) The first derivative $$\frac{dl}{dx}$$

of the lead with respect to $x$ is positive for most practical forms of gearing. This means that $l$ for the curve 33 increases with increasing $x$. The first derivative is the second-order variation of the curve. Two curves having the same $l$ and $$\frac{dl}{dx}$$

for a given $x$ value are more nearly similar than those matching only first-order variation and usually follow one another more closely than curves which are merely tangent.

(3) The second derivative $$\frac{d^2l}{dx^2}$$

of the lead with respect to $x$ is negative for most practical forms of gearing. This means that the first derivative $$\frac{dl}{dx}$$

diminishes with increasing $x$. The second derivative is the third-order variation of the curve 33. Curves having the same $l$, $$\frac{dl}{dx}$$

and $$\frac{d^2l}{dx^2}$$

for a given value of $x$ are more nearly similar than those matching only first and second-order variations.

In general, the first-order variation, the lead $l$, can be said to affect the direction (tangent line) of the curve; the second-order variation $$\frac{dl}{dx}$$

affects the curvature of the curve; and the third-order variation $$\frac{d^2l}{dx^2}$$

is an indication of the rate of change of curvature. In general, two curves having equal values for these three parameters at a given point (necessarily a point of tangency because of the equality of slopes) will be found to match each other quite closely for some distance on either side of the point.

Since it is evident that even in the simple case chosen as an example, the formula for the curve 33 is too complicated to permit an exact mechanical reproduction of the curve, my method is directed to cutting a thread which will closely approximate the curve by making the lead, curvature and rate of change of curvature of the thread equal to the lead, curvature and rate of change of curvature of the curve 33 at one transverse plane of the curve.

To facilitate the cutting of the thread in this form, I make use of a thread-cutting machine in which the movement of the tool is a sinusoidal function of the rotation of the work. Such a machine is shown diagrammatically in Figs. 3 and 4.

The machine is provided with two shafts or spindles 40, 50 which are located perpendicularly to each other and are connected by a chain of reducing gearing (not shown) which permits changing the gear ratio G between the two shafts.

The shaft 40 is a power-driven work spindle carrying the worm blank 20.

The shaft 50 is the actuator for the tool and carries an arm 60 having a pin 61 engaging a slot 71 in a carriage 70 which is mounted for rectilinear movement. In the form shown in Fig. 3, the track 72 on which the carriage 70 moves is parallel to the axis of the work 20. Since the slot 71 is perpendicular to the track 72, the movement given to the carriage by the arm is proportional to the sine of the angle $\alpha$ between the arm and the direction of movement of the carriage.

A slide 80 is mounted on the carriage 70 for adjustment longitudinal of the carriage by means of a screw and hand wheel 81. The slide 80 carries the tool post 90 which is mounted on a transverse slide 91. For simplicity in illustration, a turning tool is shown on the tool post, but it should be understood that a rotary tool or a rotary grinder may in some cases be more desirable.

The slide 91 must, of course, be operated so as to keep the tool in contact with the work as the carriage is moved and to feed it into the work as the cutting progresses. No means for this purpose is shown in Fig. 3, but Fig. 4 shows a cover plate 92 containing an inclined slot 93 which embraces the tool post 90 and causes it to move parallel to the inclined side of the work when the carriage 70 is moved on its track. The tool may be fed into the work by displacing the cover plate and slot 93 laterally by means of a screw and hand wheel 94.

The machine provides for a number of separate individual adjustments which, taken together, determine the motion given to the tool:

The gear ratio G between the work spindle 40 and the shaft 50 may be adjusted by changing gears in the gear connection between them.

The effective length A of the arm 60 may be adjusted by changing the position of the pin 61 on the arm 60. This adjustment is indicated by a series of holes in the arm in Fig. 3, but it is to be understood that a much finer adjustment of the distance A should be provided.

The third adjustment is made by changing the position of the slide 80 by means of the hand wheel 81. This adjustment is used to set the arm 60 at a predetermined angle $\alpha_0$ when the tool engages the work at a selected intermediate plane of the work.

I will now explain how these three adjustments can be made in such a way as to make the lead of the thread cut by the machine and the first two derivatives of this lead equal to the corresponding parameters of a spiral curve to be approximated.

The spiral cut by the tool may be formulated in the same way as the relative velocity vector spiral was formulated, namely, as $$m = f(x)$$

where $m$ is the lead of the thread cut by the tool in inches per radian, and $x$, as before, represents the distance in inches along the axis of the conical blank measured from a point at the distance $a$ from the apex of the cone.

The lead $m$ of the spiral cut by the tool may be expressed more simply in terms of the angle $\alpha$ between the arm 60 and the direction of travel of the carriage 70. The lead $m$ in terms of $\alpha$ is $$m = \frac{A}{G} \sin \alpha \qquad (2)$$

The relation between $\alpha$ and $x$ is apparent from the geometry of the machine and is $$dx = A \sin \alpha \, d\alpha \qquad (3)$$

The first and second derivatives of the lead $m$ with respect to $x$ may be obtained from Equations 2 and 3 and are as follows:

$$\frac{dm}{dx} = \frac{l}{G} \cot \alpha \qquad (4)$$

$$\frac{d^2m}{dx^2} = \frac{-1}{AG \sin^3 \alpha} \qquad (5)$$

The reason that the derivatives of the lead of the spiral cut by the machine may be expressed in such simple form is to be found in the arrangement of the machine which makes the movement of the tool a sinusoidal function of the rotation of the work. The simplicity of these expressions makes it practicable to use them in determining settings of the machine which produce a spiral having a predetermined lead, curvature and change of curvature.

It is evident from Equations 2, 4 and 5 that for all values of $\alpha$ between 0 and 90 the lead $m$ and its first derivative $$\frac{dm}{dx}$$

are positive, while the second derivative $$\frac{d_2m}{dx_2}$$

is negative. Thus, the curve generated by the machine has the same general variable lead characteristics as those of the relative velocity vector spiral.

The lead $m$ and its derivatives may be evaluated for any value of $x$. A value $x_0$ is chosen to determine the transverse plane of the work at which the thread is to correspond exactly with the relative velocity vector spiral. This plane should be an intermediate plane of the work, preferably about half way between its two ends. Since $\alpha$ is a function of $x$, the value which $\alpha$ has when $x = x_0$ is termed $\alpha_0$. To find the values of the lead $m$ and its derivatives in the transverse plane of the work determined by $x_0$, it is necessary merely to substitute the constant $\alpha_0$ for the variable $\alpha$ in Equations 2, 4 and 5, so that they become:

$$m_0 = \frac{A}{G} \sin \alpha_0 \qquad (2°)$$

$$\left(\frac{dm}{dx}\right)_0 = \frac{l}{G} \cot \alpha_0 \qquad (4°)$$

$$\left(\frac{d^2m}{dx^2}\right)_0 = \frac{-1}{AG \sin^3 \alpha_0} \qquad (5°)$$

These three equations contain three values which may be changed by adjustments of the machine, namely, $\alpha_0$, G and A. Solving the equations for these three values, we obtain:

$$\cos^2 \alpha_0 = -\frac{\left(\frac{dm}{dx}\right)_0^2}{m_0 \left(\frac{d^2m}{dx^2}\right)_0} \qquad (6)$$

$$G = \frac{\cot \alpha_0}{\left(\frac{dm}{dx}\right)_0} \qquad (7)$$

$$A = \frac{Gm_0}{\sin \alpha_0} \qquad (8)$$

The machine settings required to make the thread cut by the machine approximate the relative velocity vector spiral 33 may now be obtained by computing from Equation 1 the numerical values of the lead $l$ and its first two derivatives for the case where $x = x_0$, and substituting these values for the lead $m_0$ and its derivatives in Equations 6, 7 and 8.

This gives the values of A, G and $\alpha_0$ by which the machine is to be set. The change speed gears connecting the shafts 40 and 50 are changed to give the gear ratio between these shafts the calculated value of G. The position of the pin 61 on the arm 60 is adjusted to make its distance from the shaft 50 equal to the calculated value of A. The arm 60 is set at an angle to the direction of movement of the carriage equal to the calculated value of $\alpha_0$ when the tool is positioned to contact with the work 20 in the selected plane determined by the selected value $x_0$. To make this setting, it is necessary to adjust the relative longitudinal position of the work and the tool without moving the arm 60. This may be done by adjusting the slide 80 by means of the hand wheel 81. If the tool engages the work at this selected plane, the slide 80 may be adjusted to move the carriage 70 and the arm 60 so as to bring the arm 60 to the required angle. If preferred, the arm 60 may first be set at the required angle, and the tool may be brought into the selected plane of the work without moving the arm from its adjusted position. This is done by adjusting the slide 80. This can also be done without the slide 80 by adjusting the longitudinal position of the work on the spindle.

After the settings have been made, the machine is operated to bring the tool to one end of the blank without changing the setting of the slide 80 and without changing the longitudinal position of the work on its spindle. The tool is then set in by means of the hand wheel 94 and the machine is operated in the ordinary manner to cut a thread on the worm blank and a hob of the same shape. The thread may be made by a single cut or by a number of successive cuts. In the latter case, no change is made in the machine settings between the successive cuts. The thread will closely approximate the relative velocity vector spiral defined by Equation 1. It will coincide with that spiral in one transverse plane of the worm and will differ only slightly from the spiral in other transverse planes of the worm.

My method is by no means limited to producing gearing of the type which has been described in this specific example in which a conical worm is set at right angles to a gear. The method may be used for making gearing in which a conical worm has its axis at an oblique angle to the gear. In this case, the equation for the lead of the relative velocity vector spiral is more complicated than Equation 1, but, after calculation of the value of the lead and its first two derivatives in a selected intermediate plane of the worm, there is no difficulty in using the method which has been described for cutting a thread which, in the selected plane, has its lead and the first two derivatives of its lead equal to those of the relative velocity vector spiral.

My method may also be applied to gearing in which the worm has a surface of revolution which is not conical. In the case of conoidal worms, the formula for the lead of the relative velocity vector spiral is rendered more complicated by the fact that the angle $t$, instead of being a constant, is a function of $x$, as is also the vertex position $a$. After the lead of this curve and its first two derivatives have been calculated for a selected transverse plane, a thread duplicating the lead and its derivatives in this selected plane can be produced by the method described. The only change needed in the machine in this case is the substitution for the cover plate 92 of Fig. 4 of a cover plate containing a curved slot corresponding to the profile of the surface of revolution of the worm.

To complete this disclosure, I will give a detailed description of a specific thread-cutting machine for approximating a given spiral on the cone of any taper, and I will give a numerical example of the setting of this machine to cut a worm approximating the relative velocity vector spiral of a specific gearing.

The machine shown in Figs. 5 to 10 has a hollow frame 100 providing a table top 101.

The work spindle 40' is journalled in a head stock 41. The work spindle 40' is driven by gearing from a stub shaft 42 connected through bevel gears 43 and a vertical shaft 44 with a power shaft 45. The head stock may be swiveled about the vertical shaft 44 so as to place one side of the work 20 parallel to the length of the table. The angular position of the head stock is indicated on a fixed protractor 46 by a mark 47 on the head stock.

The actuator shaft 50' is placed horizontally below the table top at one end of the table. The actuator shaft is connected to the power shaft 45 which drives the work spindle through change speed gears 51 and a shaft 52 carrying a worm 53 which meshes with a face gear 54 on the actuator shaft.

The arm 60' is fixed on one end of the actuator shaft 50' so that it may swing from an inclined position to a vertical position. The arm has a way carrying the slide 62 on which the pin 61' is mounted. The position of the pin 61' on the arm 60' is adjusted by a screw 63 which may be turned by a head 64 at its upper end.

The carriage 70' is mounted in ways 72' for movement lengthwise on the table top. The carriage has an extension consisting of a horizontal member 73 and a vertical member 74 containing a vertical slot 71' in which is a roller 65 mounted on the pin 61'. It will be seen that the arrangement for moving the carriage is similar to that shown in Fig. 3 except that the actuator shaft is in a horizontal plane, and the arm and the slotted portion of the carriage are in a vertical plane. As in Fig. 3, the movement of the carriage is proportional to the sine of the angle between the arm and the direction of motion of the carriage. This angle may be read from a fixed protractor 66 and a mark on an indicator 67 secured to one side of the arm near its upper end.

On the carriage 70' is a cross-slide 91' movable by a screw and hand wheel 94'. On the cross-slide is mounted a longitudinal slide 80' movable by a screw and hand wheel 81'. The tool post 90' is mounted on the slide 80'.

From the above description, it will be seen that the machine is operatively the same as the machine shown diagrammatically in Figs. 3 and 4, except that the work spindle is first adjusted on its swivel to make its angle with the carriage track, indicated on the protractor 46, equal to the taper angle $t$ of the blank. The carriage is then moved parallel to the side of the blank instead of parallel to the axis of the blank as in Fig. 3. The movement of the tool itself is the same as that obtained by the carriage of Fig. 3 and the cover plate with the inclined slot shown in Fig. 4; but changes in the axial distance $x$ caused by movements of the carriage are not equal to movements of the carriage but to such movements multiplied by the cosine of the taper angle $t$ of the cone.

In figuring the settings for this machine, it is, therefore, necessary to make a slight change in the equations by introduction of the constant $\cos t$ in Equations 2, 3, 5 and 8. These equations accordingly become:

$$m = \frac{A}{G} \cos t \sin \alpha \qquad (2')$$

$$dx = A \cos t \sin \alpha \, d\alpha \qquad (3')$$

$$\frac{d^2 m}{dx^2} = \frac{-1}{AG \cos t \sin^3 \alpha} \qquad (5')$$

$$A = \frac{Gm_0}{\cos t \sin \alpha_0} \quad (8')$$

I will now give a specific example of setting the machine of Figs. 5 to 10 to cut a thread closely approximating the relative velocity vector spiral of a specific gearing of the type shown in Figs. 1 and 2 in which:

The gear ratio $K=20$;
The taper angle $t=10°$;
The interaxial distance $C=4$ inches; and
The distance $a=4$ inches.

The transverse plane at which the curve cut by the machine is to correspond exactly with the relative velocity vector spiral is the plane between the two ends of the worm defined by the value $$x_0 = 3\tfrac{1}{8} \text{ inches}$$

The numerical values in this plane of the lead and the first two derivatives of the lead of the relative velocity vector spiral are obtained by substituting the value $x_0$ for $x$ in Equation 1 and its derivatives are as follows:

$$l_0 = .212609 \text{ inch}$$

$$\left(\frac{dl}{dx}\right)_0 = .008236 \text{ inch}$$

$$\left(\frac{d^2l}{dx^2}\right)_0 = -.002844 \text{ inch}$$

To obtain the machine settings which will make the lead of the spiral cut by the tool and its first two derivatives identical with those of the relative velocity vector spiral, the above values for the lead $l$ and its derivatives in the plane determined by $x=x_0$ are taken as the values of the lead $m$ and its derivatives in this plane.

The above values of $l_0$, $$\left(\frac{dl}{dx}\right)_0 \text{ and } \left(\frac{d^2l}{dx^2}\right)_0$$

are, therefore, taken as the values of $m_0$, $$\left(\frac{dm}{dx}\right)_0 \text{ and } \left(\frac{d^2m}{dx^2}\right)_0$$

in Equations 6, 7 and 8', with the following result:

$$\alpha_0 = 70.432°$$
$$G = 43.158$$
$$A = 9.8883 \text{ inches}$$

These are the settings of the machine required to cut on the blank a curve whose lead and first two derivatives of lead are equal to those of the relative velocity vector spiral in the transverse plane defined by $$x = x_0 = 3\tfrac{1}{8} \text{ inches}$$

The spiral cut closely approximates the relative velocity vector spiral throughout the length of the blank. When the length of the worm is 1½ inches, the thread spiral is identical with the relative velocity vector spiral in the intermediate plane which is ¾ inch from the smaller end of the worm and deviates from the relative velocity vector spiral by about .0006 inch at the ends of the worm.

There is no difficulty in setting the effective length of the arm 60' by adjusting the slide 62 by the head 64 to place the pin 61' at a distance from the axis of the shaft 50' equal to the computed value of A, and in setting the angular position of the arm 60' as shown on the protractor 66 in accordance with the computed value of $\alpha_0$ by adjusting the slide 80' after the tool has been set in a plane corresponding to $x=3\tfrac{1}{8}$ inches. But, unless a large number of change gears are provided, it is difficult to make the gear ratio G exactly equal to the computed value above given. This difficulty may be avoided without making the approximation to the relative velocity vector spiral appreciably less close.

The value of G is not critical because the values of A and $\alpha_0$ can compensate for errors in it in such a way that the machine will cut a spiral whose lead and first derivative of lead correspond exactly to those of the relative velocity vector spiral, while its second derivative of lead is a very close approximation of that of the required spiral.

Corrected values of A and $\alpha_0$ to compensate for an error in the G setting are obtained as follows:

Let $G = G'$ where $G'$ is a practicable approximation of the computed value of G.

The corrected value of $\alpha_0$ can then be obtained by rearranging Equation 7 as follows:

$$\cot \alpha'_0 = G'\left(\frac{dm}{dx}\right)_0 \quad (9)$$

and the corrected value of A, obtained from Equation 8', is as follows:

$$A' = \frac{G'm_0}{\cos t \sin \alpha'_0} \quad (10)$$

This gives a new set of values $G'$, $A'$ and $\alpha'_0$ for settings of the machine which duplicate the lead and the first derivative of the lead exactly. The amount of the error resulting in the second derivative is obtained by computing from Equation 6 the value of the second derivative $$\left(\frac{d^2m}{dx^2}\right)_0'$$

corresponding to the corrected value $\alpha'_0$ and comparing it with the computed value of the second derivative $$\left(\frac{d^2l}{dx^2}\right)_0$$

In the numerical example given, the gear ratio G may be approximated by simply dropping the decimal part, so that $$G' = 43$$

Then from Equation 9

$$\cot \alpha'_0 = .354152$$

and $$\alpha'_0 = 70.498°$$
$$\sin \alpha'_0 = .942631$$

so that, from Equation 10

$$A' = 9.8482$$

With this new set of values, it will be found that the difference between $$\left(\frac{d^2m}{dx^2}\right)_0 \text{ and } \left(\frac{d^2l}{dx^2}\right)_0$$

is only .000018 inch. The effect of this small error in matching the second derivative is negligible. Consequently, setting the machine in accordance with the value $\alpha'_0$, $A'$ and $G'$ produces a worm having the characteristics already described in connection with the spiral cut by the machine with the settings $\alpha_0$, A and G.

In my U. S. Patent No. 2,696,125, issued December 7, 1954, I described a skew axis gearing containing a tapered worm with a thread of constant lead which approximated the relative velocity vector spiral. Gearing produced by the method of my present invention differs from that described in my aforesaid patent in that the lead of the thread of the worm is varying as distinguished from constant and approximates the relative velocity vector spiral much more closely than can any constant lead worm.

The thread-cutting machines described herein are the subject-matter of my co-pending application filed February 18, 1954, Serial No. 411,167.

In the claims that follow, "relative velocity vector" in a skew axis gearing means the direction of the relative movement between the outer surface of the worm and the cognate surface of revolution about the gear axis at a point of the line of contact of these two surfaces when they are rotated at a predetermined speed ratio, and "the relative velocity vector spiral" of the gearing means the spiral curve on the outer surface of the worm which is co-directional with the relative velocity vector at each point at which it intersects said line of contact.

I claim:

1. A gearing consisting of a gear and a worm rotary at a predetermined speed ratio about axes which are non-parallel or non-intersecting, in which the worm has an outer surface which is a predetermined surface of revolution and a thread whose axial lead, curvature and rate of change of curvature are equal to the lead, curvature and rate of change of curvature of "the relative velocity vector spiral" at one transverse plane of the worm and whose axial lead differs slightly from the axial lead of "the relative velocity vector spiral" at other transverse planes of the worm, and the gear has teeth meshing with the thread of the worm.

2. A gearing consisting of a gear and a frusto-conical worm rotary at a predetermined speed ratio about axes which are perpendicular and non-intersecting, in which the worm has a thread of varying lead closely approximating "the relative velocity vector spiral" and the gear has teeth meshing with this thread.

3. The method of making a gearing consisting of a gear and a worm rotary at a predetermined speed ratio about predetermined gear and worm axes which are non-parallel and non-intersecting, which comprises cutting a thread on a worm blank and a similar hob blank by rotating the work and moving a tool along the work at a rate which is a sinusoidal function of the turning of the work and rotating the threaded hob and a gear blank about the predetermined axes at the predetermined speed ratio to cut teeth on the gear.

4. The method of cutting a thread on a worm blank comprising rotating the work and moving a tool along the work at a rate which is proportional to the sine of an angle which is a fraction of the angle through which the work is turned, after separately setting the relation between the angle through which the work is turned and the angle whose sine is used, the relation between the sine of this angle and the extent of movement of the tool, and the value which this angle has when the tool engages the work at a selected intermediate transverse plane of the work to predetermine the lead of the thread and its first two derivatives in this transverse plane.

References Cited in the file of this patent

UNITED STATES PATENTS

| | | |
|---|---|---|
| 1,751,540 | Cone | Mar. 25, 1930 |
| 1,867,782 | Trbojevich | July 19, 1932 |
| 1,934,754 | Wildhaber | Nov. 14, 1933 |
| 2,028,148 | Elbertz | Jan. 21, 1936 |
| 2,360,235 | Jellis | Oct. 10, 1944 |